(12) United States Patent
Tanaka et al.

(10) Patent No.: US 6,264,368 B1
(45) Date of Patent: Jul. 24, 2001

(54) FLUID BEARING MOTOR

(75) Inventors: Katsuhiko Tanaka; Ikunori Sakatani; Kazuhiro Uemura, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/333,954

(22) Filed: Jun. 16, 1999

(30) Foreign Application Priority Data

| Jun. 16, 1998 | (JP) | 10-168682 |
| Dec. 24, 1998 | (JP) | 10-367962 |
| Jan. 20, 1999 | (JP) | 11-012411 |

(51) Int. Cl.$^7$ .................................................. F16C 32/06
(52) U.S. Cl. ................................. 384/112; 384/124
(58) Field of Search ....................... 384/100, 107, 384/112, 113, 121, 123, 124

(56) References Cited

U.S. PATENT DOCUMENTS

| 5,658,080 | * | 8/1997 | Ichiyama | 384/112 |
| 5,997,179 | * | 12/1999 | Khan et al. | 384/107 |
| 6,059,459 | * | 5/2000 | Ichiyama | 384/112 |
| 6,066,903 | * | 5/2000 | Ichiyama | 384/107 X |

FOREIGN PATENT DOCUMENTS

WO094029607 * 12/1994 (WO) .................................. 384/113

* cited by examiner

*Primary Examiner*—Sherry Estremsky
*Assistant Examiner*—Roger Pang
(74) *Attorney, Agent, or Firm*—Sughrue, Mion, Zinn, Macpeak & Seas, PLLC

(57) ABSTRACT

A fluid bearing motor having sufficient room for securing an air chamber for use in quickly discharging bubbles that have entered a thrust fluid bearing and a reservoir for supplying a lubricating fluid to the thrust fluid bearing. Moreover, the fluid bearing motor can easily be fabricated. The fluid bearing motor includes a shaft member 1, a sleeve 2 cooperating with the shaft member and a thrust collar 3 which is fixed to the shaft member 1 and extended in the diametric direction. The circumferentially-directed contour of the outer peripheral face of the thrust collar 3 is made elliptic, so that a reservoir 8 and an air chamber 9 are formed between the outer peripheral face of the thrust collar 3 and the face 4a of the mating member (sleeve).

14 Claims, 6 Drawing Sheets

(PRIOR ART) FIG.9

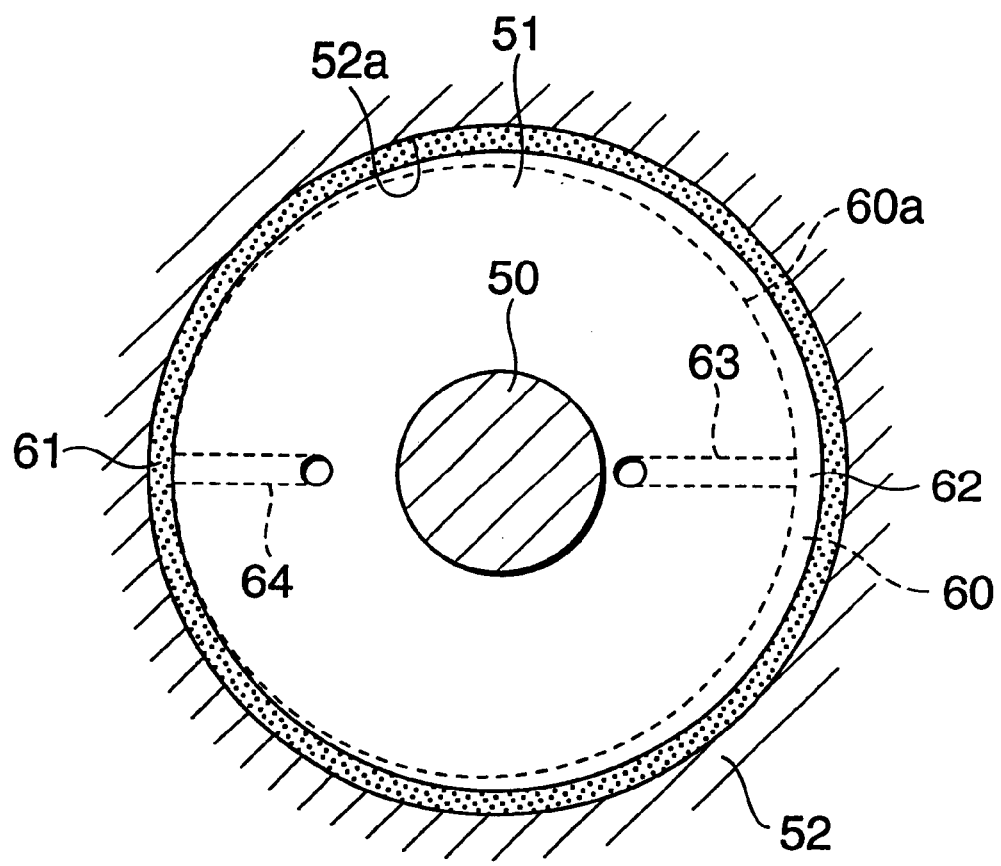
(PRIOR ART) FIG.10

FLUID BEARING MOTOR

BACKGROUND OF THE INVENTION

This invention relates generally to spindle motors for use in information, audio and video equipment and more particularly to a fluid bearing motor fit for use in a magnetic disk unit, an optical disk unit or the like.

As a conventional fluid bearing motor, there is a fluid bearing motor for a magnetic disk as shown in FIG. 9, for example.

In this fluid bearing motor, a thrust collar 51 is fixed to the outer peripheral surface 50a of a shaft member 50, and a thrust fluid bearing portion 100 is formed among the outer peripheral surface 50a, an undersurface 51b of the thrust collar 51 and an upper surface 52b of a sleeve 52 which faces the undersurface 51b.

Further, a radial fluid bearing portion 200 is formed under the thrust collar 51 and between the outer peripheral surface 50a of the shaft member 50 and an inner peripheral surface 52c of the sleeve 52.

In FIG. 9, reference numeral 53 denotes a stator, 54 indicates a rotor magnet, and 55 defines a back yoke.

However, bubbles may remain in the thrust fluid bearing portion 100 of such a fluid bearing motor when a lubricating fluid is poured into the thrust fluid bearing portion 100 and may also be mixed with the lubricating fluid in the thrust fluid bearing portion 200 due to the repetition of starting and stopping the operation. When the temperature of the lubricating fluid rises in such a state that the bubbles have thus been mixed therein, the lubricating fluid may be forced out through the bearing gaps because of the expansion of air, to thereby occur a problem that the reliability of the fluid bearing motor is deteriorated.

Moreover, the lubricating fluid tends to scatter because of the high-speed rotation or otherwise to become easily exhausted from the thrust fluid bearing portion as it evaporates during long-term use. Another problem is that the thrust fluid bearing may often seize during long-term use.

Method for solving the foregoing problems is suggested in the Japanese Patent Unexamined Publication No. Hei. 8-163820. The invention taught by the publication No. Hei. 8-163820 is such that, as shown in FIG. 10, a groove 60 is formed circumferentially in the outer peripheral face of a thrust collar 51 in such a way as to form a true circular contour 60a which is eccentric with respect to the thrust collar 51 as well as a shaft member 50 in order to make the shallow portion of the groove 60 or a portion without the groove 60 a reservoir 61 for storing a lubricating fluid while making the deep portion of the groove 60 an air chamber 62 by varying the volume of the diametric space between the thrust collar 51 and the inner peripheral face of a sleeve 52. Further, providing a fluid channel 63 for communicating the air chamber 62 with the atmosphere causes the bubbles mixed with the lubricating fluid in the bearing gap to be gathered in the air chamber 62 before being discharged outside through the fluid channel 63.

Further, an oil supply channel 64 similar in structure to the fluid channel 6.3 communicates with the reservoir position opposite to the air chamber 62 (if the groove 60 is shallow or otherwise non-existent). In this conventional fluid bearing motor, it is intended to prevent the lubricating fluid from being exhausted from the thrust fluid bearing portion by supplying the lubricating fluid from the reservoir 61 via the oil supply channel 64 to the inner diameter side of the thrust fluid bearing portion.

The contour of the outer peripheral face of the thrust collar 51 and the contour of the inner peripheral face 52a of the sleeve 52 diametrically opposite to the outer peripheral face thereto as disclosed in the Japanese Patent Unexamined Publication No. Hei. 8-163820 are true circles in both cases.

Although the oil supply channel 64 is allowed to communicate with the reservoir 61 in the device of the Japanese Patent Unexamined Publication No. Hei. 8-163820, the present inventors found by experiment that the existence of the oil supply channel 64 resulted in weakening the generation of a wedge film itself and instead of supplying the lubricating fluid from the reservoir 61 onto the inner diameter side of the thrust fluid bearing portion the oil supply chambers causes bubbles to be readily discharged into the lubricating fluid bearing within the reservoir as the air flowed backward under the influence of the oil supply channel 64 which was opened to an area where the negative pressure passing the pressure peak of the wedge film is generated, that is, opened close to the area where the cavitation occurs. Since the bubbles thus discharged revolve in the eccentric groove 60 formed in the outer peripheral face of the thrust collar as the fluid revolves, there develops a problem of slightly moving the rotational axis during the revolution of the bubbles.

It was also found from the results of observation above that in such an arrangement as to provide the reservoir and the air chamber by forming the true circle eccentrically with reference to the rotational center, the rotational axis was slightly moved. In other words, the rotational center was forced to move in one direction by the pressure generated by the wedge effect of the reservoir portion having only the narrow gap as the speed increased even though no bubbles were generated; the problem in this case is that an unfavorable influence resulting therefrom becomes conspicuous during the high-speed rotational operation in particular.

When applied to magnetic disk units, fluid bearing motors are required to have higher rotational accuracy with the progress of developing-high-speed disk units and attaining improved surface recording density. Consequently, even slight movement of the rotational axis during the high-speed rotational operation becomes increasingly problematical and in addition to improvement in reliability and durability, it is urgently necessary to solve the foregoing problems.

SUMMARY OF THE INVENTION

An object of the present invention in view of the foregoing problems is to provide a fluid bearing motor capable of securing an air chamber for quickly discharging bubbles which are mixed with a fluid in a thrust fluid bearing portion and a reservoir for providing a lubricating fluid bearing for the thrust fluid bearing portion and offering higher rotational accuracy.

In order to accomplish the object above, a fluid bearing motor according to the present invention comprises a shaft member and a sleeve as a mating member cooperating with the shaft member, wherein the shaft member has a thrust collar extending in a diametric direction; thrust fluid bearings are formed among both sides of the thrust collar and the mating member; a reservoir for storing a lubricating fluid and an air chamber with air existing therein are formed between the outer peripheral face of the thrust collar and the mating member along the circumferential direction; and the air chamber communicates with the atmosphere via a fluid channel, and is characterized in that the whole or part of a circumferentially-directed contour of at least one of the outer peripheral face of the thrust collar and the face of the mating member is formed so that a gap between the outer peripheral face of the thrust collar and the face of the mating member varies in the circumferential direction and that a relatively small gap portion out of the gap between the outer peripheral face of the thrust collar and the face of the mating member is formed as the reservoir, whereas a relatively large gap portion out of the gap therebetween is formed as the air chamber.

The aforementioned "the whole or part of one of the faces" also includes a case where not only part of the circumferentially-directed but also part of the axially-directed contour in the circumferential direction is varied (also inclusive of a case where a groove is formed in the outer peripheral face of the thrust collar).

According to the present invention, part or the whole of the circumferentially-directed contour of at least one of the outer peripheral face of the thrust collar and the face of the mating member is deformed from an eccentric or true circle configuration so as to form the reservoir and the air chamber. Therefore, it is possible to form the reservoir relatively free in size and configuration and the air chamber for holding the lubricating fluid excessively.

A configuration resulting from deforming the true circular contour as the circumferentially-directed contour is preferably axially or rotationally symmetrical. The rotationally symmetrical configuration can suppress the generation of unnecessary vibration when the number of rotations varies during the time the bearing rotates in particular as the reservoir and the air chamber are arranged rotationally symmetrically.

Unlike the conventional example, the oil supply channel (reference numeral 64 in FIG. 10) is unnecessary and as the pressure of the lubricating fluid in the small-gap reservoir is increased because of the wedge effect during the rotational operation and the lubricating fluid is supplied to the peripheral edge portion of the thrust fluid bearing in the outer diametric direction, whereby the lubricating fluid is prevented from being exhausted from the bearing surface. This action is demonstrated as the rotational speed is increased in particular. The lubricating fluid can be supplied to the peripheral edge portion of the thrust fluid bearing in the outer diametric direction uniformly in a less-fluctuating condition by making the aforementioned contour rotationally symmetrical.

BRIEF DESCRIPTION OF THE DRAWINGS

FIG. 9 is a sectional view illustrating a conventional fluid bearing motor; and

FIG. 10 is a plan view illustrating a contour of the outer peripheral face of a thrust collar, a reservoir, an air chamber and the like in the conventional fluid bearing motor.

DESCRIPTION OF THE PREFERRED EMBODIMENTS

An embodiment of the present invention will now be described with reference to the drawings.

Figure 1:
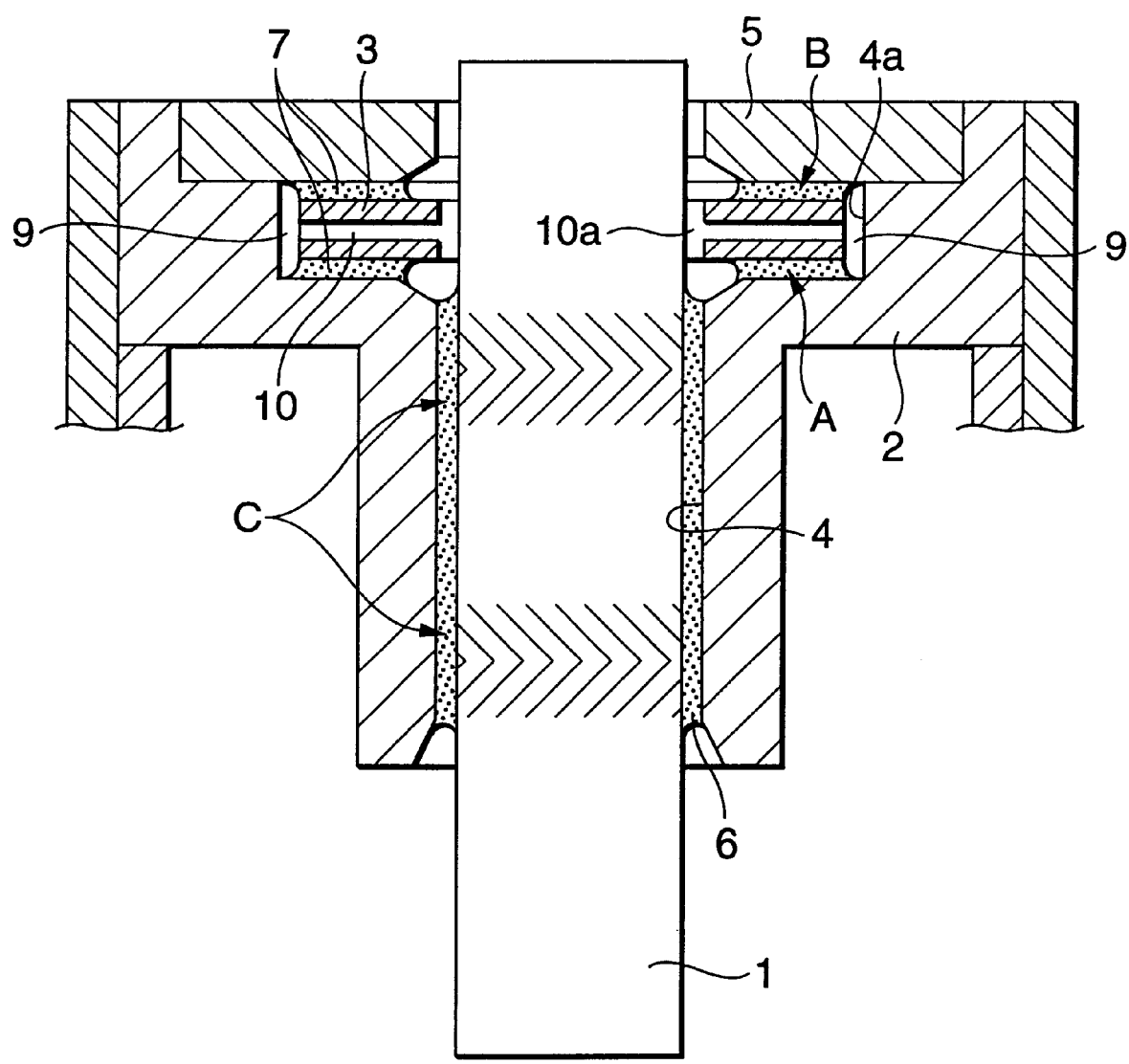
FIG. 1 is a sectional view illustrating a fluid bearing motor as a first embodiment of the invention.

FIG. 1 is a block diagram of a fluid bearing motor embodying the present invention.

This motor is built up by inserting a shaft member 1 fixed to a base (not shown) into an mating member 4 which is provided for a sleeve 2.

A thrust collar 3 is coaxially fixed to the outer peripheral face on the upper end portion side of the shaft member 1. The thrust collar 3 may be fixed by press-fitting, shrink-fitting, bonding, welding or the like. Needless to say, the thrust collar 3 and the shaft member 1 may be made integrally, though working is hard and costly.

A mating member 4 cooperating with the thrust collar 3 is provided with a diametrically mating member portion 4a (an opposed face) which has a diameter larger than the outer diameter of the thrust collar 3 and is opposed to the outer peripheral surface of the thrust collar 3. The mating member 4 is also provided with a face that opposes to the undersurface of the thrust collar 3 in an axial direction of the shaft member 1. A first thrust fluid bearing A is formed between that face and the undersurface of the thrust collar 3.

Further, a thrust plate 5 is disposed opposite to the upper surface of the thrust collar 3 in such a manner that a second thrust fluid bearing B is formed between the surface of the thrust collar 3 and the thrust plate 5. The thrust plate 5 is a disk-like member fixed to the sleeve 2 and has a hole opened in its central portion through which the shaft member 1 passes.

A pair of upper and lower radial fluid bearings C are formed between the outer periphery of the shaft member 1 and the mating member 4, and these radial fluid bearings C are disposed under the thrust collar 3.

Radial fluid bearing portions of the shaft member 1 which form the pair of upper and lower radial fluid bearings C have respectively groove patterns in the form of an asymmetrical herringbone shape whose outside (axial end portion side) is longer than its inside, so that a lubricating fluid is prevented from scattering during the rotational operation. However, the groove pattern is not necessarily limited to the asymmetrical herringbone shape, and also such radial fluid bearing portions may be formed on the inner peripheral surface of the mating member 4. In this case, a dynamic-pressure generating groove provided for the radial fluid bearing portion is formed in at least either outer periphery of the shaft member 1 or inner periphery of the mating member 4.

In order to reduce dynamic torque, an escape portion (not shown) having a large gap may be provided between the two radial fluid bearing portions to open an air vent hole communicating with the atmosphere in order to hold the lubricating fluid in only the bearing gap portions of the radial fluid bearings. In this case, the escape portion provided in the inner peripheral face of the sleeve 2 or the outer peripheral face of the shaft is preferably tapered in cross section where both ends of the escape portion is narrowed toward the bearing gap so as to increase maintenance of the lubricating fluid.

Further, a stator fixed to the base, a rotor magnet and a back yoke fixed to a hub 100 are disposed in the outer peripheral direction as before on the outer peripheral side of the dynamic bearing (see FIG. 9).

In FIG. 1, reference numerals 6 and 7 denote lubricating fluid.

Figure 2:
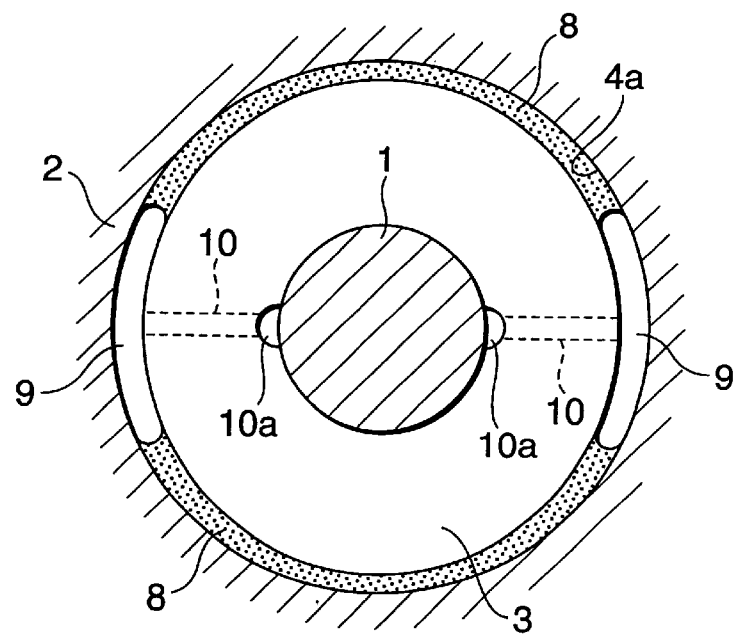
FIG. 2 is a plan view illustrating a contour of the outer peripheral face of a thrust collar, a reservoir, an air chamber and the like according to the first embodiment of the invention.

As shown in a plan view of FIG. 2, the contour of the outer periphery of the thrust collar according to this embodiment of the invention is formed into an ellipse as one of the rotational symmetrical configurations, whereby a gap with respect to the inner peripheral face (true or substantially true circular) of the mating member 4 is formed so as to vary in the circumferential direction. In other words, lubricating-fluid reservoirs 8 are formed in a small gap portion (on the long diameter sides) and the lubricating fluid held by wedge films exist in the respective positions of the reservoirs 8 and moreover air chambers 9 containing the air exist in a large gap portion (on the short diameter sides) during the rotational operation.

Further, fluid channels 10 extending in the short diametric directions and diametrically passing through the thrust collar 3 are provided in the thrust collar 3, and the inner diameter sides 10a of the respective fluid channels 10 are extended and opened vertically. Each of the air chambers 9 communicates with the atmosphere via the fluid channel 10.

Unlike the conventional example, no oil supply channel communicating with the reservoir 8 is provided according to this embodiment of the invention.

In the fluid bearing motor thus arranged, the reservoirs 8 formed on the outer peripheral portion of the thrust fluid bearing function as those for supplying the lubricating fluid to the thrust fluid bearings and also act as lubricating-fluid supply sources in order to prevent the lubricating fluid from being exhausted during long-term use. More specifically, the pressure generated in the lubricating fluid of the reservoirs 8 increases because of the-wedge effect during the rotational operation, thus causing the lubricating fluid of the reservoirs to flow axially. Consequently, the lubricating fluid is supplied to the peripheral edge portion of the thrust fluid bearing portion in the outer diametric direction, whereby the lubricating fluid is prevented from flowing out and being exhausted due to the centrifugal force applied from the thrust fluid bearing portion.

The bubbles mixed with the lubricating fluid in the bearing gaps are separated-caught and gathered in the air chambers 9 while the bearings are actuated, and the air is successively discharged into the atmosphere via the fluid channels 10.

As the contour itself of the outer peripheral face of the thrust collar 3 is deformed from the true circle whereby to provide the reservoirs 8 and the air chambers 9, the size, positions and the number of the reservoirs 8 as well as the air chambers can relatively freely be set up.

The gap between the outer peripheral face of the thrust collar 3 of the reservoir portion 8 and the mating member 4 is not greater than 300 $\mu$m, preferably not greater than 150 $\mu$m in view of the maintenance of the lubricating fluid.

According to this embodiment of the invention, moreover, the contour itself of the outer peripheral face of the thrust collar 3 is deformed from the true circle into the ellipse, that is, a rotationally symmetrical configuration, so that the two reservoirs 8 and the air chambers 9 are formed symmetrically on the rotational axis. Therefore, the rotation is well balanced and restrained from producing unnecessary vibration even when the gap along the outer peripheral face of the thrust collar 3 is varied in the circumferential direction.

The contour of the outer peripheral may be made pseudo-elliptic with the gap gradually decreased toward the smallest gap instead of being simply elliptic.

Figure 3:
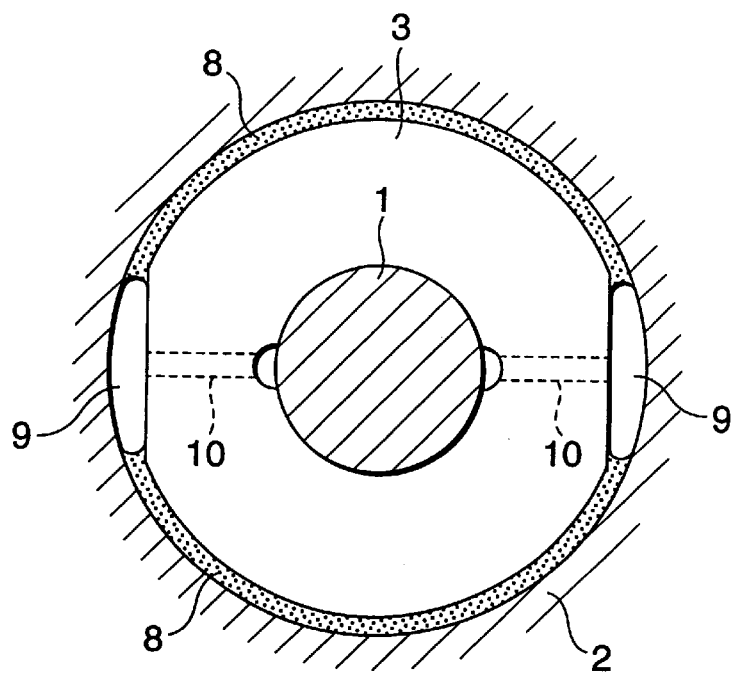
FIG. 3 is a plan view illustrating another example of the contour of the outer peripheral face according to the first embodiment of the invention.

As shown in FIG. 3, moreover, the contour of the outer peripheral face of the thrust collar 3 may be made true circular with two D-cut places to attain a rotationally symmetrical configuration whereby to vary the gap with respect to the mating member 4 (true or substantially true circular) in the circumferential direction.

Although a description has been given of a case where the contour of the outer peripheral face of the thrust collar 3 is laterally symmetrical, that is, axially symmetrical so as to form the pair of reservoirs 8 and that of air chambers 9 by way of example, the contour thereof may be rotationally symmetrical at every 120 degrees whereby to form three of the reservoirs and three of the air chambers. As it has been arranged that the contour of the outer peripheral face of the thrust collar 3 is thus deformed from the true circle, greater freedom of designing the configurations of reservoirs and air chambers and the number of them is ensured.

A description has also been given of a case where the contour of the outer peripheral face of the thrust collar 3 is deformed from the true circle while the shaft member 1 is fixed but the mating member 4 is rotatable by way of example according to the aforementioned embodiment of the invention. On the other hand, reservoirs and air chambers may be provided in the case of that the shaft member 1 is rotatable but the mating member 4 is fixed. At that time, the contour of the outer peripheral face of the thrust collar 3 is set true or substantially true circular, while the contour of the face 4a of the mating member is deformed from the true circle into an ellipse.

Further, it is preferred for the first and second thrust fluid bearings A and B each to have the groove for generating the dynamic pressure. With respect to the thrust fluid bearing which is not always subjected to any axial load, however, the provision of such a groove for generating the dynamic pressure may be omitted.

A second embodiment of the invention will now be described with reference to the drawings, wherein like reference characters are given to like component parts in the first embodiment thereof and the detailed description thereof will be omitted.

Figure 4:
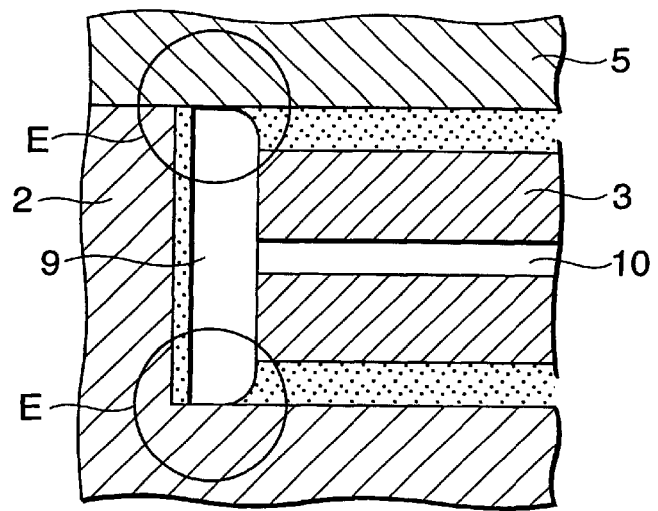
FIG. 4 is a partial enlarged view illustrating problems during the high-speed rotational operation in the fluid bearing motor according to the first embodiment of the invention.

According to the first embodiment of the invention, though the size and positions of reservoirs 8 and air chambers 9 and the number of them can relatively freely be set, the residual bubbles tend to gather in both axial end portions (positions E) of each air chamber 9 where the gap between the outer peripheral face of the thrust collar 3 and the mating member becomes greatest during the rotational operation as shown in FIG. 4. When the bubbles are gathered greatly at the positions E during the rotational operation at a high speed of over 10,000 rpm in particular, there is the possibility that the lubricating fluid stops flowing into the thrust fluid bearing portion at the position of the air chamber 9. This causes the lubricating fluid to be exhausted from the bearing, which may seize because of a decrease in the floating quantity.

Such a fluid bearing motor as disclosed according to the second embodiment of the invention is arranged for preventing the lubricating fluid from being exhausted from the thrust fluid bearing portion even during the rotational operation at a high speed of over 10,000 rpm.

Figure 5:
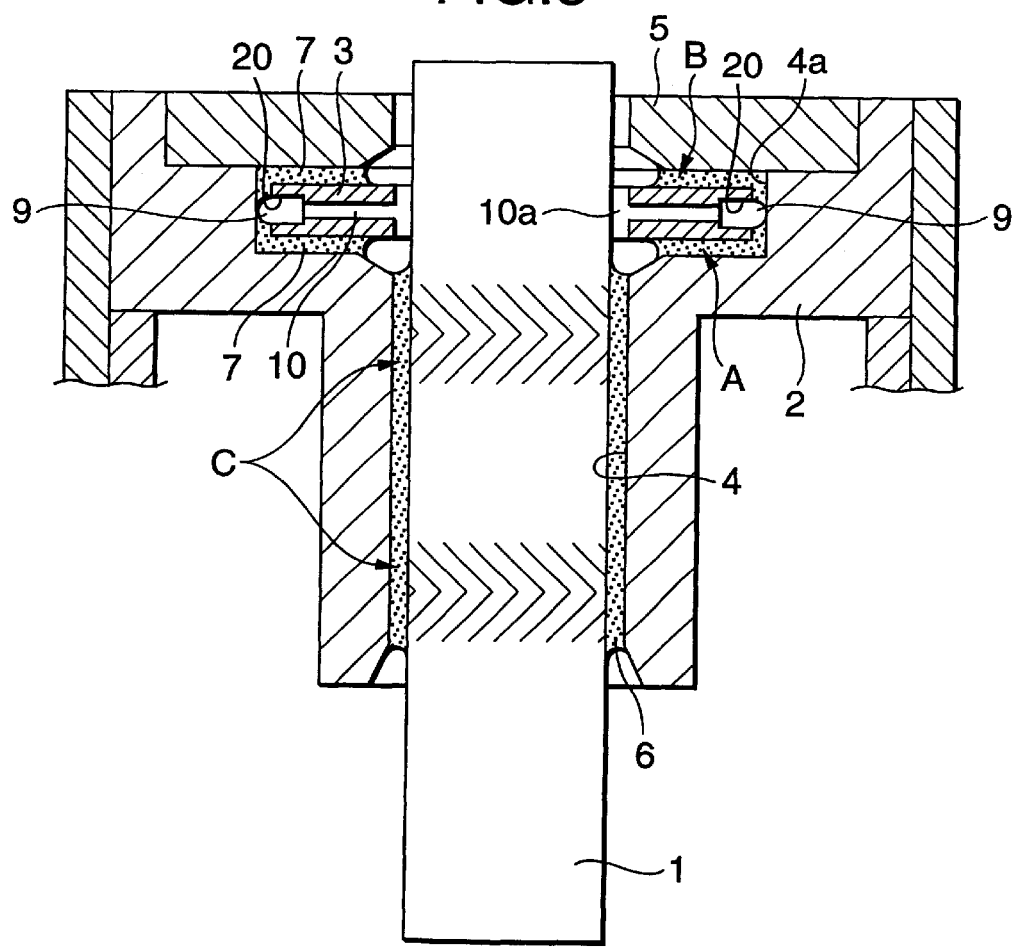
FIG. 5 is a sectional view illustrating a fluid bearing motor as a second embodiment of the invention.
Figure 6:
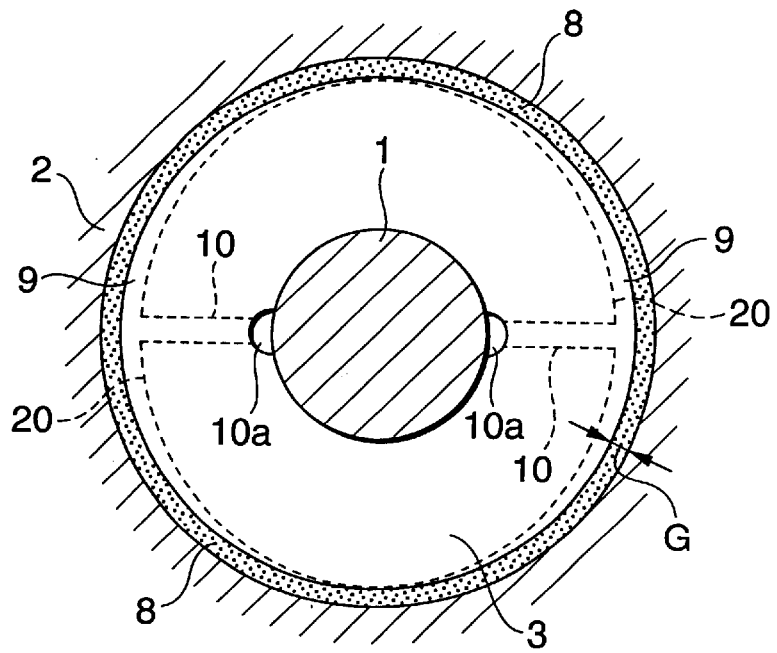
FIG. 6 is a plan view illustrating a contour of the outer peripheral face of a thrust collar, a reservoir, an air chamber and the like according to the second embodiment of the invention.

In order to prevent the bubbles from gathering at the positions E of the air chamber 9, a recessed groove 20 is formed in the outer peripheral face of the thrust collar 3 as shown in FIGS. 5 and 6. According to this embodiment of the invention, any portion other than the recessed groove 20 in the outer peripheral configuration of the thrust collar 3 maintains a true or substantially true circular contour which is coaxial with the shaft member 1.

The circumferential contour of the base of the recessed groove 20 is formed into an elliptic peripheral face which is rotationally symmetrical, so that the gap between the outer peripheral face of the thrust collar 3 and the (true or substantially true circular) inner peripheral face of the mating member varies circumferentially.

Thus, each reservoir 8 is formed with the lubricating fluid existing in the small gap portion due to the wedge film during the rotational operation, and each air chamber 9 is formed with air existing in the large gap portion. Consequently, the air is readily gathered in the recessed groove 20 particularly in the axially central portion of the air chamber 9 to promote releasing the air from the fluid channel 10.

In this case, the base of the recessed groove 20 may be formed into a pseudo-elliptic wedge shape with the gap gradually decreased toward the smallest gap instead of a simple ellipse. Although the cross sectional shape of the recessed groove 20 may be semi-arcuate, V-shaped or the like, a rectangular recessed groove 20 in cross section is advantageous in letting the wedge film act effectively.

With the arrangement above, not only the same effect as what is attainable according to the first embodiment of the invention is made achievable thereby but also the air in the air chambers 9 can be gathered effectively at the positions of the recessed grooves 20 provided in the axially central portion of the outer peripheral face of the thrust collar 3. Consequently, the flow of the lubricating fluid from the reservoir 8 toward the axially end portion side of the thrust collar 3 is facilitated even during the rotational operation at a high speed of over 10,000 rpm.

In other words, high pressure is generated because of the wedge effect in the lubricating fluid existing in each reservoir 8 with the small gap during the rotational operation and the lubricating fluid flows axially, thus causing the lubricating fluid to flow in both the axial end portions at the position of the air chamber 9. Consequently, the lubricating fluid can be supplied uniformly to the thrust fluid bearing portion.

Figure 7:
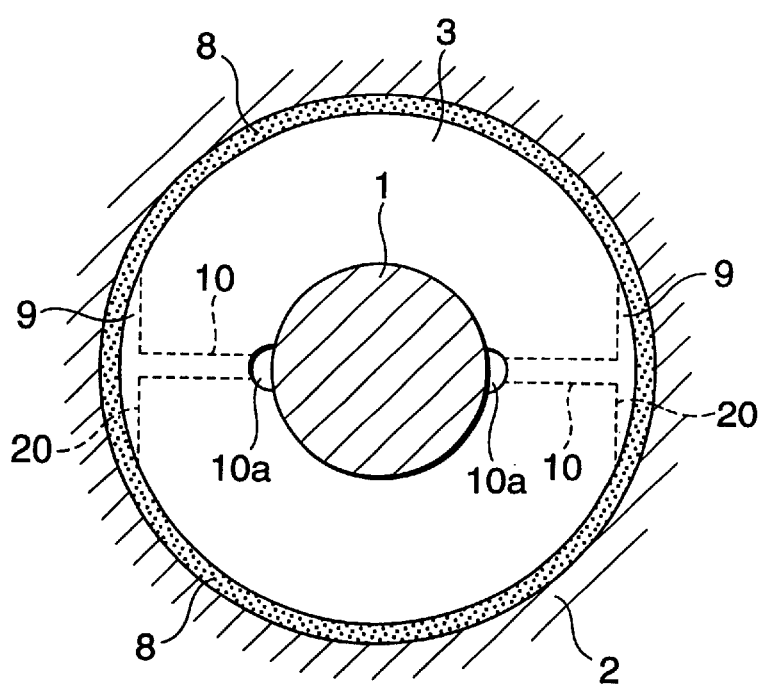
FIG. 7 is a plan view illustrating another example of the contour of the outer peripheral face according to the second embodiment of the invention.

In this case, the contour of the base of the recessed groove 20 along the circumferential direction is not limited to be elliptic. As long as the contour above is rotationally symmetrically formed, the contour of the recessed groove 20 along the circumferential direction is set true or substantially true circular in principle as shown in FIG. 7, for example. However, the gap with respect to the inner peripheral face (true or substantially true circular) of the mating member may be formed so as to vary circumferentially by providing a D-cut in two axially symmetrical places.

Figure 8:
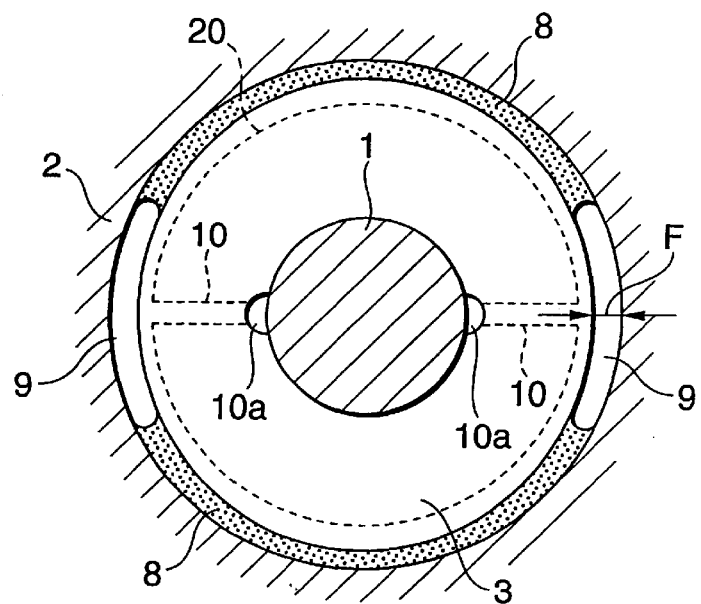
FIG. 8 is a plan view illustrating still another example of the contour of the outer peripheral face according to the second embodiment of the invention.
Figure 8:
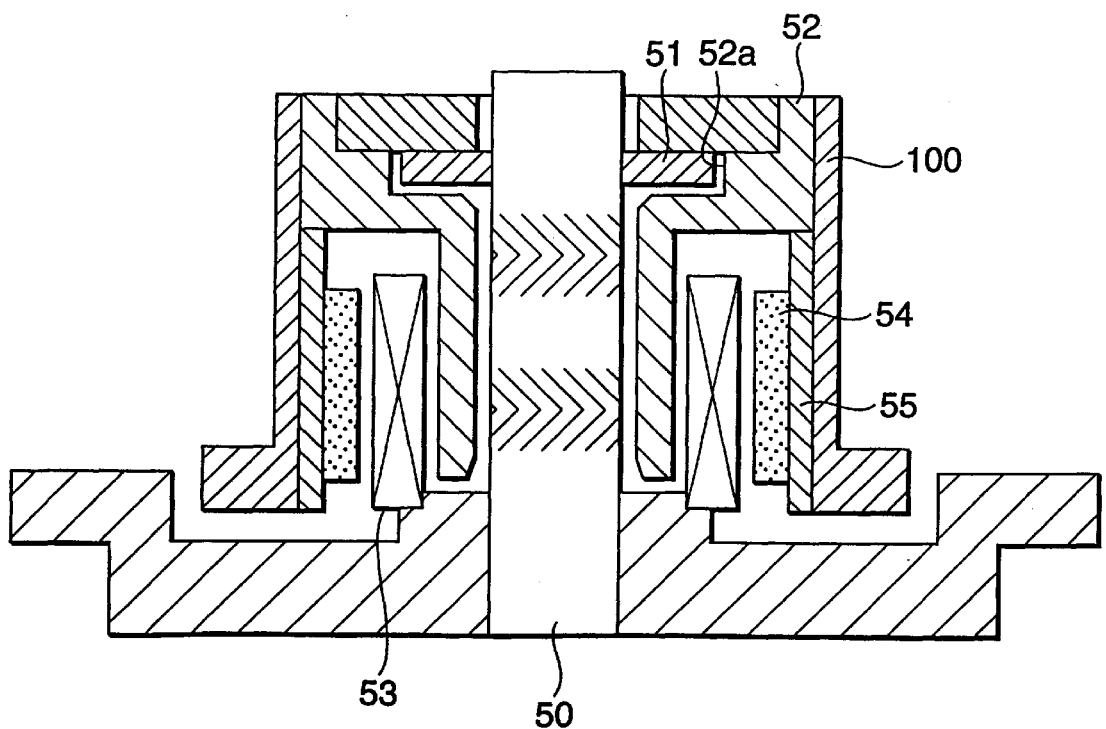

Although the axially central portion of the outer peripheral face of the thrust collar 3 is caused to vary circumferentially according to the aforementioned embodiment of the invention, the gap between the outer peripheral face of the thrust collar 3 and the inner peripheral face (true or substantially true circular) of the mating member may also be formed so as to vary circumferentially as shown in FIG. 8.

In this case, the outer peripheral face of the thrust collar 3 excluding the recessed groove 20 is formed into an elliptic contour which is rotationally symmetrical and making the base of the recessed groove 20 cylindrical or substantially cylindrical as in the case of the aforementioned first embodiment of the invention, for example.

In this case, however, there arises a problem in that the surface tension may weaken if the long-to-short diameter ratio of the ellipse is increased and if the circumferential gap F in the gap portion is set too large in order to strengthen the wedge film, thus making it hard to hold the lubricating fluid.

With the arrangement of FIG. 8, the contour along the circumferential direction of the recessed groove 20 may be elliptic.

In the construction shown in FIGS. 6 and 8, contours of the base of the recessed groove 20 may be eccentric circular. In the case of an eccentric circle, an elliptic configuration is preferred because the eccentric circular one is accompanied with the slight movement of the axis during the high-speed rotational operation.

When the outer peripheral face of the thrust collar 3 is true or substantially true circular (see FIG. 6), the gap G between the axially end portion of the outer peripheral face of the thrust collar 3 excluding the recessed groove 20 and the mating member (see FIG. 6) is kept small so that the surface tension acts thereon, whereby the lubricating fluid is seen to be held in that portion even during the high-speed rotational operation. In other words, the circumferential gap G must be small so as to hold the lubricating fluid in the circumferential gap by the surface tension in the stationary state and during the rotational operation. It has been proved desirable that the circumferential gap G is preferably 300 µm or smaller and 150 µm or smaller if possible, depending on the kind of the lubricating fluid, in order to hold the lubricating fluid by means of the surface tension.

Moreover, the presence of the opening of the supply channel (oil supply channel) for circulating the lubricating fluid, a hollow or the like in the reservoir 8 will impair the lubricating-fluid holding action by means of the wedge film at the position of the reservoir 8. Therefore, it is desirable that with respect to the recessed groove 20 provided in the outer peripheral face of the thrust collar 3, the base of the recessed groove 20 in the smallest gap portion out of any portion of the reservoir 8 should substantially conform to the outer peripheral face of the thrust collar 3 (i.e., shallowest or zero in view of its depth). If the depth of the recessed groove 20 in the position where the air chamber 9 is formed is set at preferably 20 µm or greater and 50 µm or greater if possible, the air in the air chamber 9 is readily gathered, which is preferred in view of the performance of separating-catching the bubbles mixed with the lubricating fluid.

When the outer peripheral face of the thrust collar 3 is elliptic as shown in FIG. 8, moreover, each reservoir 8 as a small gap portion is required to act as what holds the lubricating fluid as well as supplying oil to the thrust fluid bearing portion during the rotational operation by making use of the pressure generated by the wedge film. Consequently, the gap between the small gap portion and the mating member needs to be smaller, namely, preferably 300 µm or smaller and 150 µm or smaller if possible. The depth of the recessed groove 20 in this case is preferably 1 mm or smaller and 500 µm or smaller if possible in its largest portion.

Since the oil supply channel is absent in the small gap portion of the reservoir 8, that is, since no oil supply channel 64 (see FIG. 10) is opened to the area where the negative pressure passing the pressure peak of the wedge film is generated, that is, opened close to the area where the cavitation occurs, the air flows backward without causing bubbles to be discharged into the thrust fluid bearing, thus preventing the rotational accuracy from being deteriorated.

As the whole or part of the outer peripheral face of the thrust collar 3 is only required to be formed so as to vary the circumferential gap with respect to the mating member, the present invention is not limited to the elliptic and D-cut contours according to the aforementioned embodiments of the invention but may be polygonal ones which are triangular and quadrilateral.

However, counter force due to the wedge film acts unidirectionally (without acting on the axial symmetry) at the time of high-speed operation when the contour is not rotationally symmetrical but eccentric as before and this is not desirous because the rotational axis tries to move slightly. In other words, forming the contour into the rotationally symmetrical configuration, particularly into the axially symmetrical ellipse is ideal because the axis is not moved even when the number of rotations varies.

Incidentally, a generatrix configuration of the outer peripheral face of the thrust collar 3 is not limited to be cylindrical as defined according to the aforementioned embodiment of the invention but may be like a beer barrel or a drum. In other words, it has been confirmed that no problem would raised if there is room for the gap with respect to the mating member, though the outer peripheral face of the thrust collar 3 is configured slightly like a beer barrel when the groove for use in generating the dynamic pressure is provided for the bearing by coining as plastic working after the thrust collar 3 is press-fitted into the shaft member 1.

When the recessed groove 20 is provided in the outer peripheral face of the thrust collar 3 according to the embodiment of the invention of FIG. 6 to make the contour of the base of the recessed groove 20 elliptical along the circumferential direction, the outer peripheral face of the thrust collar 3 other than the recessed groove that has originally been subjected to cutting work into a cylindrical configuration is affected by the elliptic base of the recessed groove thus subjected to the cutting work beforehand. When the groove for use in generating the dynamic pressure is formed by coining, that outer peripheral face of the thrust collar 3 is reduced to be slightly deformed, substantially cylindrical (pseudo-elliptic) but no problem is raised from the standpoint of its performance as already confirmed. In other words, the contour of the outer peripheral face of the thrust collar 3 in the circumferential direction is not limited to a cylinder having the substantially true circular configuration but may be a substantially cylindrical having a contour which is a substantially true circular which is slightly pseudo-elliptic, oval like a parallel-elliptic or polygonal, and formed by coining under the influence of the configuration of the base of the recessed groove 20 in the circumferential direction.

The viscosity and kind of lubricating fluid for use are not especially limited but the lubricating fluid may be oil whose dynamic viscosity at 40° C. is 50 cSt (centistokes) or lower and 25 cSt or lower if possible in order to reduce the power consumption of the spindle motor when it is used at not less than 10,000 rpm. Such oil for use is also not limited but includes synthetic oil, mineral oil, fluorine oil and the like.

As the lubricating fluid, use may be made of a lubricant made of a plurality of mixed oils, a lubricant containing an antioxidant, if necessary, for suppressing the deterioration of bearing material and oil and evaporating quantity, and an electroconductive lubricant. A lubricant containing oil whose dynamic viscosity at 40° C. is not higher than 25 cSt or mixed oil containing an antioxidant is most suitable as a lubricating fluid for a spindle motor of the sort mentioned above because it reduces power consumption, suppresses the deterioration of bearing material and oil and evaporating quantity and is excellent in durability.

Since the radial and thrust fluid bearings are required only to generate the dynamic pressure during the rotational operation, the bearing type and the configuration of the dynamic-pressure generating groove are not limited to those described in the embodiments of the present invention.

Since the gap between the whole or part of the outer peripheral face of the thrust collar 3 and the mating member is varied in the circumferential direction as in the case of the first embodiment of the invention, the small gap portion functions as the reservoir 8 for holding and supplying the lubricating fluid to the thrust fluid bearing, whereas the large gap portion functions as what separates and catches the bubbles mixed with the lubricating fluid in the air chamber 9 and discharges the bubbles into the external atmosphere via the fluid channel. According to the second embodiment of the invention, further, providing the recessed groove 20 in the outer peripheral face of the thrust collar 3 makes it possible to hold the lubricating fluid at all times in the circumferential gap portion G by means of the surface tension. Since the residual bubbles and those generated during the rotational operation are gathered preferentially at the position of the recessed groove 20 in the axially central portion of the outer peripheral face of the thrust collar before being discharged outside via the fluid channel 10, the bubbles are prevented from being rolled up in the thrust fluid bearing during the high-speed rotational operation to say nothing of the initial period of rotation to ensure that the lubricating fluid is never exhausted.

The axial rotation is also applicable in the second embodiment of the invention as in the case of the first embodiment thereof.

The present invention is based on Japanese Patent Applications No. Hei. 10-168682, No. Hei. 10-367962, and No. Hei. 11-102411, which are incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As set forth above, the adoption of the present invention has the effect of facilitating the work of forming the aforementioned reservoirs and air chambers and increasing the freedom of designing the configuration and size of the reservoir and air chamber and the number of them when a fluid bearing motor excellent in reliability is produced by providing the reservoir as the source of supplying the lubricating fluid to the thrust fluid bearing and the air chamber for use in discharging bubbles so as to prevent the lubricating fluid from being exhausted and to free the bearing gap from the residual bubbles.

What is claimed is:

1. A fluid bearing motor comprising:
   a shaft member having a thrust collar which is projected in a radial direction of the shaft member;
   a mating member cooperating with said shaft member, said mating member and said thrust collar being relatively rotated;

a lubricating fluid provided between said thrust collar and said mating member for forming a thrust fluid bearing therebetween;

a reservoir for storing said lubricating fluid;

an air chamber with air existing therein are formed between the outer peripheral surface of the thrust collar and the mating member along the circumferential direction; and a fluid channel communicating said air chamber with an atmosphere, wherein at least part of a circumferentially-extending contour of one of the outer peripheral surface of the thrust collar and the inner peripheral surface of the mating member forms a circumferentially extending gap between the outer peripheral surface of the thrust collar and the inner peripheral surface of the mating member which varies in the circumferential direction to make the contour in a rotatively symmetric shape about an axis of said shaft member, and wherein the shape of the contour has coplanar major and minor axes, the major axis having a greater length than the minor axis, and wherein a relatively small gap portion out of the gap between the outer peripheral surface of the thrust collar and the inner peripheral surface of the mating member is formed as the reservoir, whereas a relatively large gap portion out of the gap therebetween is formed as the air chamber.

2. The fluid bearing motor according to claim 1, further comprising:

a grooved portion formed in one of the outer peripheral surface of the thrust collar and the inner peripheral surface of the mating member, to thereby provide said circumferentially extending gap between a bottom surface of said grooved portion and the other of the outer peripheral surface of the thrust collar and the inner peripheral surface of the mating member.

3. The fluid bearing motor according to claim 1, further comprising:

a grooved portion formed in one of the outer peripheral surface of the thrust collar and the inner peripheral surface of the mating member, to thereby provide a circumferentially extending clearance between a bottom surface of said grooved portion and the other of the outer peripheral surface of the thrust collar and the inner peripheral surface of the mating member with a constant distance therebetween in the radial direction, wherein a remaining portion other than grooved portion of the one of the outer peripheral face of the thrust collar and the inner peripheral surface of the mating member is confronted with the other of the outer peripheral face of the thrust collar and the inner peripheral surface of the mating member through said circumferentially extending gap.

4. A fluid bearing motor comprising:

a shaft member having a thrust collar which is projected in a radial direction of the shaft member;

a mating member cooperating with said shaft member, said mating member and said thrust collar being relatively rotated;

a lubricating fluid provided between said thrust collar and said mating member for forming a thrust fluid bearing therebetween;

a reservoir for storing said lubricating fluid;

an air chamber with air existing therein are formed between the outer peripheral surface of the thrust collar and the mating member along the circumferential direction; and a fluid channel communicating said air chamber with an atmosphere, wherein at least part of a circumferentially-extending contour of one of the outer peripheral surface of the thrust collar and the inner peripheral surface of the mating member forms a circumferentially extending gap between the outer peripheral surface of the thrust collar and the inner peripheral surface of the mating member which varies in the circumferential direction to make the contour in a rotatively symmetric shape about an axis of said shaft member, and wherein a relatively small gap portion out of the gap between the outer peripheral surface of the thrust collar and the inner peripheral surface of the mating member is formed as the reservoir, whereas a relatively large gap portion out of the gap therebetween is formed as the air chamber, and wherein said circumferentially-extending contour is substantially in an ellipse shape.

5. A fluid bearing motor comprising:

a shaft member having a thrust collar which is projected in a radial direction of the shaft member;

a mating member cooperating with said shaft member, said mating member and said thrust collar being relatively rotated;

a lubricating fluid provided between said thrust collar and said mating member for forming a thrust fluid bearing therebetween;

a reservoir for storing said lubricating fluid;

an air chamber with air existing therein are formed between the outer peripheral surface of the thrust collar and the mating member along the circumferential direction;

a fluid channel communicating said air chamber with an atmosphere;

wherein at least part of a circumferentially-extending contour of one of the outer peripheral surface of the thrust collar and the inner peripheral surface of the mating member forms a circumferentially extending gap between the outer peripheral surface of the thrust collar and the inner peripheral surface of the mating member which varies in the circumferential direction to make the contour in a rotatively symmetric shape about an axis of said shaft member, and wherein a relatively small gap portion out of the gap between the outer peripheral surface of the thrust collar and the inner peripheral surface of the mating member is formed as the reservoir, whereas a relatively large gap portion out of the gap therebetween is formed as the air chamber, and a grooved portion formed in one of the outer peripheral surface of the thrust collar and the inner peripheral surface of the mating member, to thereby provide said circumferentially extending gap between a bottom surface of said grooved portion and the other of the outer peripheral surface of the thrust collar and the inner peripheral surface of the mating member, wherein said circumferentially-extending contour is substantially in an ellipse shape.

6. A fluid bearing motor comprising:

a shaft member having a thrust collar which is projected in a radial direction of the shaft member;

a mating member cooperating with said shaft member, said mating member and said thrust collar being relatively rotated;

a lubricating fluid provided between said trust collar and said mating member for forming a thrust fluid bearing therebetween;

a reservoir for storing said lubricating fluid;

an air chamber with air existing therein are formed between the outer peripheral surface of the thrust collar and the mating member along the circumferential direction;

a fluid channel communicating said air chamber with an atmosphere;

wherein at least part of a circumferentially-extending contour of one of the outer peripheral surface of the thrust collar and the inner peripheral surface of the mating member forms a circumferentially extending gap between the outer peripheral surface of the thrust collar and the inner peripheral surface of the mating member which varies in the circumferential direction to make the contour in a rotatively symmetric shape about an axis of said shaft member, and wherein a relatively small gap portion out of the gap between the outer peripheral surface of the thrust collar and the inner peripheral surface of the mating member is formed as the reservoir, whereas a relatively large gap portion out of the gap therebetween is formed as the air chamber, and a grooved portion formed in one of the outer peripheral surface of the thrust collar and the inner peripheral surface of the mating member, to thereby provide a circumferentially extending clearance between a bottom surface of said grooved portion and the other of the outer peripheral surface of the thrust collar and the inner peripheral surface of the mating member with a constant distance therebetween in the radial direction, wherein a remaining portion other than said grooved portion of the one of the outer peripheral face of the thrust collar and the inner peripheral surface of the mating member is confronted with the other of the outer peripheral face of the thrust collar and the inner peripheral surface of the mating member through said circumferentially extending gap, and wherein said circumferentially-extending contour is substantially in an ellipse shape.

7. A fluid bearing motor comprising:

a shaft member having a thrust collar which is projected in a radial direction of the shaft member;

a mating member cooperating with said shaft member, said mating member and said thrust collar being relatively rotated;

a lubricating fluid provided between said thrust collar and said mating member for forming a thrust fluid bearing therebetween;

a reservoir for storing said lubricating fluid;

an air chamber with air existing therein are formed between the outer peripheral surface of the thrust collar and the mating member along the circumferential direction;

a fluid channel communicating said air chamber with an atmosphere;

wherein at least part of a circumferentially-extending contour of one of the outer peripheral surface of the thrust collar and the inner peripheral surface of the mating member forms a circumferentially extending gap between the outer peripheral surface of the thrust collar and the inner peripheral surface of the mating member which varies in the circumferential direction to make the contour in a rotatively symmetric shape about an axis of said shaft member, and wherein a relatively small gap portion out of the gap between the outer peripheral surface of the thrust collar and the inner peripheral surface of the mating member is formed as the reservoir, whereas a relatively large gap portion out of the gap therebetween is formed as the air chamber, and a grooved portion formed in one of the outer peripheral surface of the thrust collar and the inner peripheral surface of the mating member, to thereby provide said circumferentially extending gap between a bottom surface of said grooved portion and the other of the outer peripheral surface of the thrust collar and the inner peripheral surface of the mating member, wherein said grooved portion is a D-shaped cut portion.

8. A fluid bearing motor comprising:

a shaft member having a thrust collar which is projected in a radial direction of the shaft member;

a mating member cooperating with said shaft member, said mating member and said thrust collar being relatively rotated;

a lubricating fluid provided between said thrust collar and said mating member for forming a thrust fluid bearing therebetween;

a reservoir for storing said lubricating fluid;

an air chamber with air existing therein are formed between the outer peripheral surface of the thrust collar and the mating member along the circumferential direction;

a fluid channel communicating said air chamber with an atmosphere;

wherein at least part of a circumferentially-extending contour of one of the outer peripheral surface of the thrust collar and the inner peripheral surface of the mating member forms a circumferentially extending gap between the outer peripheral surface of the thrust collar and the inner peripheral surface of the mating member which varies in the circumferential direction to make the contour in a rotatively symmetric shape about an axis of said shaft member, and wherein a relatively small gap portion out of the gap between the outer peripheral surface of the thrust collar and the inner peripheral surface of the mating member is formed as the reservoir, whereas a relatively large gap portion out of the gap therebetween is formed as the air chamber, and a grooved portion formed in one of the outer peripheral surface of the thrust collar and the inner peripheral surface of the mating member, to thereby provide a circumferentially extending clearance between a bottom surface of said grooved portion and the other of the outer peripheral surface of the thrust collar and the inner peripheral surface of the mating member with a constant distance therebetween in the radial direction, wherein a remaining portion other than said grooved portion of the one of the outer peripheral face of the thrust collar and the inner peripheral surface of the mating member is confronted with the other of the outer peripheral face of the thrust collar and the inner peripheral surface of the mating member through said circumferentially extending gap, wherein said grooved portion is a D-shaped cut portion.

9. The fluid bearing motor according to any one of claims 1–8, wherein said small gap is equal or less than 300 $\mu$m in the radial direction.

10. The fluid bearing motor according to claim 1, wherein said mating member includes a sleeve and a thrust plate attached to said sleeve.

11. The fluid bearing motor according to claim 1, wherein said mating member includes a sleeve, a thrust plate attached to said sleeve and a hub mounted to said sleeve.

12. A fluid bearing motor comprising:

a shaft member having a thrust collar which extends in a radial direction of the shaft member;

a mating member cooperating with said shaft member, said mating member and said thrust collar being relatively rotated;

a lubricating fluid provided between said thrust collar and said mating member for forming a thrust fluid bearing between said thrust collar and said mating member; and a fluid channel for communicating a circumferentially extending gap between said thrust collar and said mating member with an atmosphere, wherein said thrust collar is provided with a mated portion having an outer peripheral surface with a first contour extending along a circumferential direction of the shaft member, and said mating member is provided with a mating portion having an inner peripheral surface which is confronted with said outer peripheral surface of said mated portion through said circumferentially extending gap and which has a second contour extending along the circumferential direction, one of said first and second contours is substantially formed in a rotatively symmetric shape about an axis of said shaft member, and has coplanar major and minor axes, wherein the major axis has a greater length than the minor axis, and the other of said first and second contours is substantially formed in a circular shape about said axis of said shaft member, to thereby provide a reservoir for storing said lubricating fluid at a small gap portion out of said gap and an air chamber at a large gap portion out of said gap.

13. A fluid bearing motor comprising:

a shaft member having a thrust collar which extends in a radial direction of the shaft member;

a mating member cooperating with said shaft member, said mating member and said thrust collar being relatively rotated;

a lubricating fluid provided between said thrust collar and said mating member for forming a trust fluid bearing between said thrust collar and said mating member; and a fluid channel for communicating a circumferentially extending gap between said thrust collar and said mating member with an atmosphere, wherein said thrust collar is provided with a mated portion having an outer peripheral surface with a first contour extending along a circumferential direction of the shaft member, and said mating member is provided with a mating portion having an inner peripheral surface which is confronted with said outer peripheral surface of said mated portion through said circumferentially extending gap and which has a second contour extending along the circumferential direction, one of said first and second contours is substantially formed in a rotatively symmetric shape about an axis of said shaft member, and the other of said first and second contours is substantially formed in a circular shape about said axis of said shaft member, to thereby provide a reservoir for storing said lubricating fluid at a small gap portion out of said gap and an air chamber at a large gap portion out of said gap, wherein the one of said first and second contours is formed into an ellipse shape.

14. The fluid bearing motor according to claim 12, wherein said mating member is a sleeve.

* * * * *